Figures 1, 2:
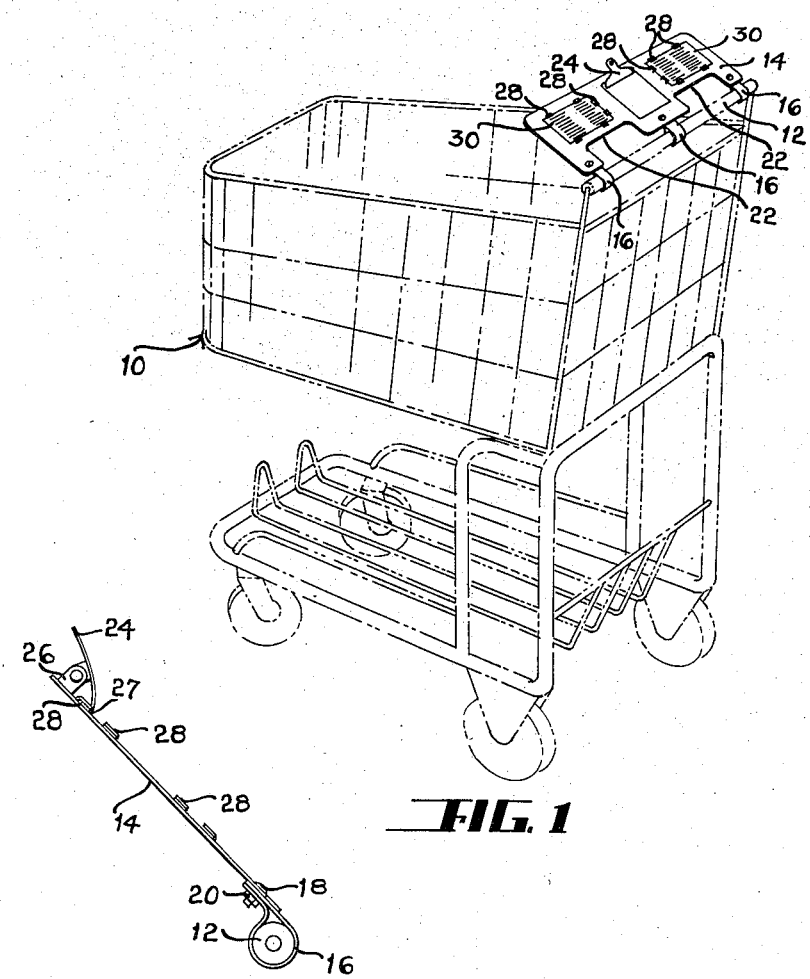

June 2, 1959  J. G. MILLER  2,888,761
DIRECTORY AND CLIP BOARD COMBINATION
Filed April 21, 1958

INVENTOR.
JAMES G. MILLER
BY
HIS ATTORNEYS

United States Patent Office 2,888,761
Patented June 2, 1959

2,888,761

DIRECTORY AND CLIP BOARD COMBINATION

James G. Miller, Middletown, Ohio

Application April 21, 1958, Serial No. 729,730

3 Claims. (Cl. 40—10)

This invention relates to a clip board designed for attachment to a shopping cart such as provided for customer use in self-service markets.

An object of this invention is the provision of a clip board which may be attached to conventional shopping carts and which is provided with a clip for retaining papers such as the user's shopping list.

Another object of this invention is the provision of a clip board for attachment to shopping carts such as provided in self-service markets which is designed to serve first, as a support for the user's papers, and second, as a display panel for a store directory or other printed matter provided by the merchant.

Other objects and advantages reside in the construction of parts, the combination thereof, the method of manufacture and the mode of operation, as will become more apparent from the following description.

In the drawing, Figure 1 is a perspective view depicting a grocery cart in phantom and illustrating the clip board of this invention attached thereto.

Figure 2 is an end elevational view of the clip board.

Referring to the drawing in greater detail, the reference numeral 10 designates a conventional shopping cart such as provided for the use of customers in self-service markets. This shopping cart is provided with a horizontal push bar 12 which the user may grasp to push the shopping cart about the store. Secured to the handle 12 is the clip board of this invention.

The clip board comprises a panel 14 which is provided along one margin thereof with three spaced clamps 16 adapted to engage the horizontal push bar 12 of the shopping cart. With reference to Figure 2, these clamps 16 are short metallic straps wrapped about the push bar 12. The ends of the straps are drawn together by means of a screw 18 penetrating the panel 14 and engaging a nut 20.

Between the spaced clamps 16 the margin of the panel 14 is cut away to provide indentations 22. These indentations permit the user of the cart to grasp the push bar 12 with his or her hands without interference from the clip board.

A conventional spring clip 24 is attached to the upper side of the panel 14, as viewed in Figure 1. With reference to Figure 2, this clip 24 is supported pivotally by a bracket 26. Spring means, not illustrated, bias the clip 24 so that the margin 27 thereof presses against the panel 14. This clip 24 is centrally located in the panel 14 so that the user of the shopping cart may secure private papers such as a shopping list in a prominent position with the clip 24.

On either side of the clip 24 a plurality of flanges 28 are struck from the plane of the panel 14. These flanges 28 are arranged in a rectangular array on each side of the clip 24 and cooperate to support display cards 30. Depending upon the desires of the operators of the self-service market, the display cards 30 may contain shopping instructions, or a store directory, or advertising matter, or the like.

As illustrated in the drawing, the clip board is preferably secured to the push bar 12 at an angle of approximately 45° to the vertical, so that the user of the shopping cart may conveniently view the front surface of the clip board while pushing the cart. It is to be understood, of course, that the exact location of the clip board upon the cart will depend in large part upon the design of the specific shopping cart to which the clip board is to be attached. Variations in the design of the clip board to meet design variations in shopping carts are deemed within the purview of this invention.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A clip board for attachment to the horizontal push bar of a shopping cart, said clip board including a substantially rigid panel member, a clip for securing paper and the like attached to one side of said panel member, said panel member having a pair of indentations along one margin thereof, and clamping means engageable with said push bar secured to said panel member along the indented margin thereof, said indentations, upon the panel member being clamped to the push bar of the shopping cart, providing openings between the panel member and the push bar for the user's hands.

2. A display panel for attachment to the push bar of shopping carts and the like, said display panel including a substantially rigid panel member having a pair of indentations along one margin thereof, and clamping means engageable with the push bar secured to the panel member along the indented margin thereof, said indentations, upon the panel member being clamped to the push bar of a shopping cart, providing openings between the panel member and the push bar for the user's hands.

3. A display panel for attachment to the push bar of shopping carts and the like, said display panel including a substantially rigid panel member and at least one clamping member engageable with a push bar secured to the panel member at one margin thereof, the panel member having an indentation in said one margin which, upon the panel member being clamped to the push bar of a shopping cart, provides an opening between the panel member and the push bar for one of the user's hands.

References Cited in the file of this patent

UNITED STATES PATENTS

| | | |
|---|---|---|
| 1,733,293 | Brow | Oct. 29, 1929 |
| 1,757,440 | Sharp | May 6, 1930 |
| 2,675,636 | Schulz | Apr. 20, 1954 |
| 2,864,189 | Campbell | Dec. 16, 1958 |